Nov. 24, 1964  J. H. SEIFARTH  3,158,362
METHOD OF BLENDING GRANULAR MATERIALS
Filed June 7, 1962  4 Sheets-Sheet 1

INVENTOR.
John H. Seifarth
BY
Marcus, Dickey + Pierce
ATTORNEYS.

INVENTOR.
John H. Seifarth

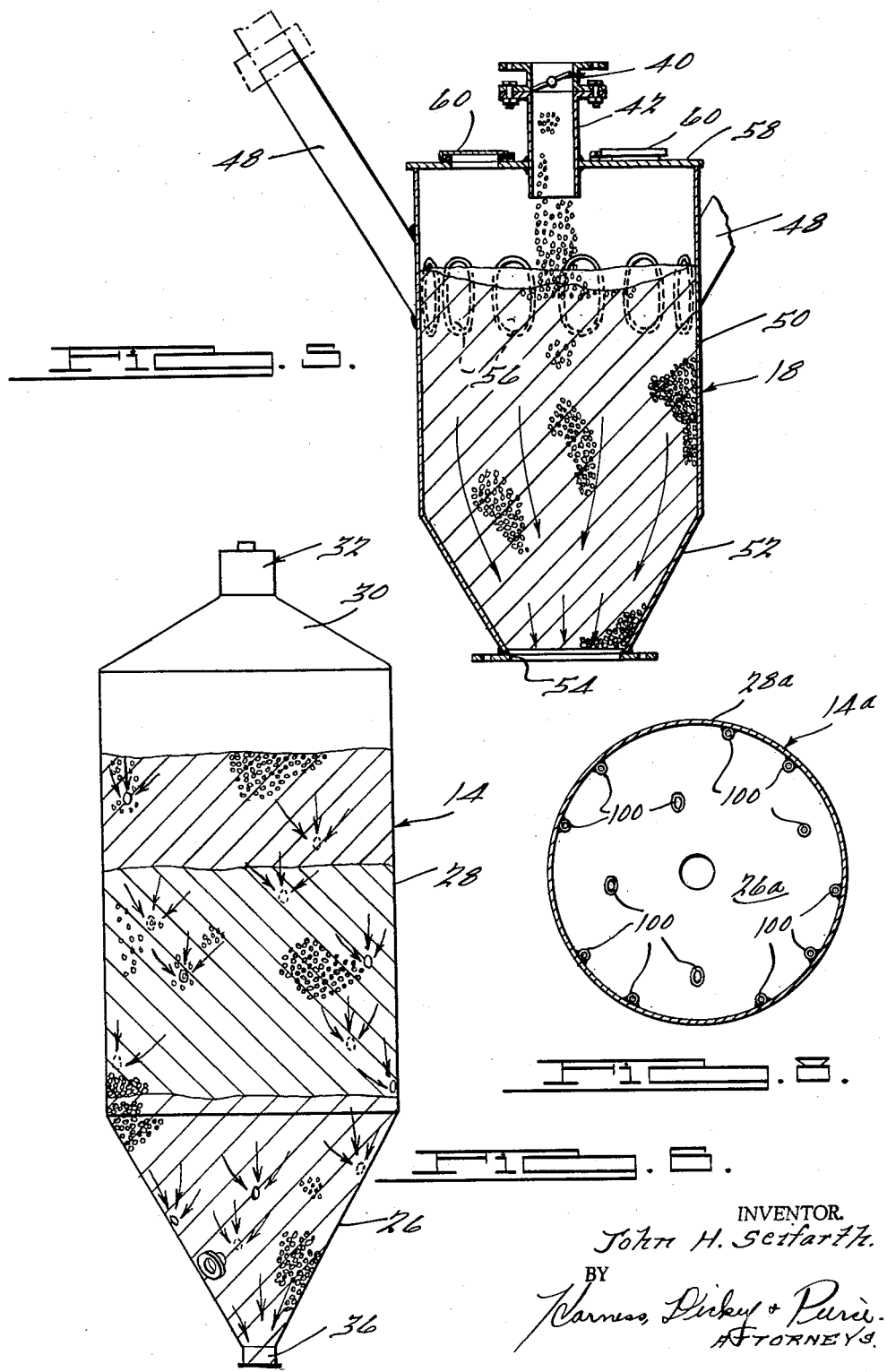

Nov. 24, 1964  J. H. SEIFARTH  3,158,362
METHOD OF BLENDING GRANULAR MATERIALS
Filed June 7, 1962  4 Sheets-Sheet 4
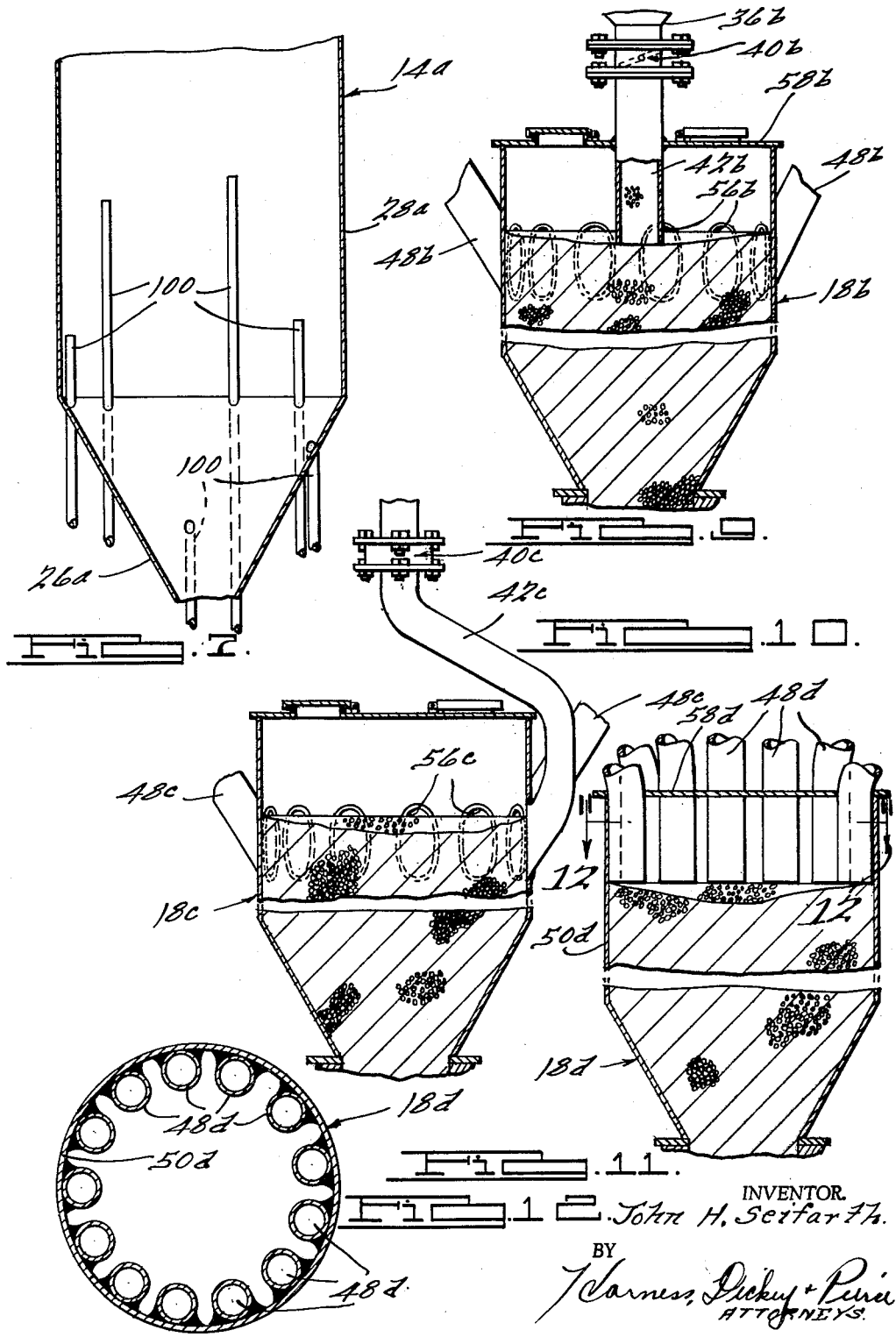
INVENTOR.
John H. Seifarth.
BY
Harness, Dickey & Pierce
ATTORNEYS.

United States Patent Office 3,158,362
Patented Nov. 24, 1964

3,158,362
METHOD OF BLENDING GRANULAR MATERIALS
John H. Seifarth, Riverton, N.J., assignor to Acheson Industries, Inc., Port Huron, Mich., a corporation of Michigan
Filed June 7, 1962, Ser. No. 200,858
4 Claims. (Cl. 259—180)

The present invention broadly relates to a blending method for mixing bulk quantities of different solid granular or particulated materials and more specifically is directed to an improved blending method of regulating the gravitational flow of the granular material through each of a plurality of conduits positioned at diverse locations in a blender tank.

A variety of mixing or blending apparatuses are in widespread industrial use for forming substantially homogeneous blends or mixtures of two or more dissimilar materials such as various types of grains, grits and abrasives, different colored plastic pellets, etc. Of these, mechanical type blenders such as drum type mixers, for example, are subject to the inherent disadvantage of having relatively small capacities and requiring a relatively high horsepower input over extended operating periods for effecting a substantially uniform mixture of the several dissimilar constituents. Mechanical mixers of this general type also have a tendency of causing attrition and abrasion of the materials being mixed producing an excessive quantity of unusable fines further detracting from the efficiency and economy of the mixing operation.

To overcome the aforementioned disadvantages inherent in mechanical mixing apparatuses and to further reduce the complexity and number of moving parts of mechanical blending equipment, various hopper or pneumatic type blenders have heretofore been used or proposed for use in which the granular material is either agitated by a high pressure fluid current or is withdrawn from selected portions of a combination mixing and storage tank and is admixed and returned thereto. In blending apparatus of the hopper type in which material is drawn from diverse locations in the tank, a continuing problem has been presented of controlling the gravitational or pressure induced flow of the granular material through each of the plurality of supply pipes. In such apparatuses, unequal flow rates frequently result in stratification of the material in the combination storage and mixing tank resulting either in a nonuniform mixture or in excessively prolonging the time required for forming a uniform mixture. To overcome this problem various intricate valving systems have been employed which necessitate careful manipulation and control to achieve the desired mixing action. The cost, complexity and susceptibility of such valving systems to malfunction in addition to the high level of regulation or control required during a blending operation, has seriously detracted from a widespread adoption of such mixing apparatus.

An object of the present invention is to provide an improved blending method of blending two or more dissimilar granular materials which is extremely efficient in blending a stratified or layered charge of the granular material differing in chemical and/or physical characteristics and forming therewith a substantially homogeneous blend without encountering excessive attrition of the material.

Still another object of the present invention is to provide an improved blending method wherein the flow of the granular material through a plurality of supply conduits connected to diverse sections of a combination storage and mixing tank is automatically controlled and regulated through a novel collector manifold assuring uniform blending within a short time interval obviating the necessity for a complex valving arrangement and careful regulatory attention during a blending operation.

The foregoing and other objects and advantages of the present invention are achieved by employing a novel collector manifold or receiver to which material is simultaneously supplied through a plurality of conduits connected at selected diverse locations in a combination storage and mixing tank or receptacle and in which manifold the granular materials are intermixed and returned to the top portion of the tank for further cycling. By virtue of the novel construction of the collector manifold, an improved flow pattern of the granular material is achieved minimizing the influence of gravitational and frictional factors and automatically regulating the simultaneous discharge of the granular material into the collector manifold assuring the attainment of substantially homogeneous mixtures within a relatively few number of cycles avoiding stratification of relatively unmixed material in the tank. The automatic leveling and flow control features of the collector manifold is achieved by positioning the discharge openings of each of the plurality of supply conduits at substantially the same level and concurrently controlling the rate of withdrawal of the material from the collector manifold which in turn controls the flow rate of the material through each of the conduits.

Other objects and advantages of the present invention will become apparent from the following detailed description taken in conjunction with the accompanying drawings, wherein FIGURE 1 is a side elevation view of a blending apparatus constructed in accordance with the preferred embodiments of the present invention including portions thereof shown in section for further clarity;

FIG. 5 is a magnified vertical sectional view of one form of the collector manifold shown in FIGURE 1 and taken substantially along the line 5—5 thereof;

FIG. 6 is an elevation view of the tank of the blending apparatus shown in FIGURE 1 and schematically illustrating a typical flow pattern of a stratified material charge out through each of the outlet nozzles connected thereto;

FIG. 7 is a fragmentary elevation view of an alternate satisfactory tank and manifold feed conduit arrangement from that shown in FIGURE 1;

FIG. 8 is a horizontal sectional view through the tank shown in FIG. 7 and taken along the line 8—8 thereof;

FIG. 9 is a vertical sectional view of an alternate satisfactory form of a tank center outlet conduit positioned within the collector manifold;

FIG. 10 is a vertical sectional view partly in elevation of still another alternate satisfactory form of a tank center outlet;

FIG. 11 is a vertical sectional view of a collector manifold illustrating an alternate satisfactory arrangement of the plurality of inlet nozzles, and FIG. 12 is a horizontal sectional view of the collector manifold shown in FIG. 11 and taken substantially along the line 12—12 thereof.

Figure 1:
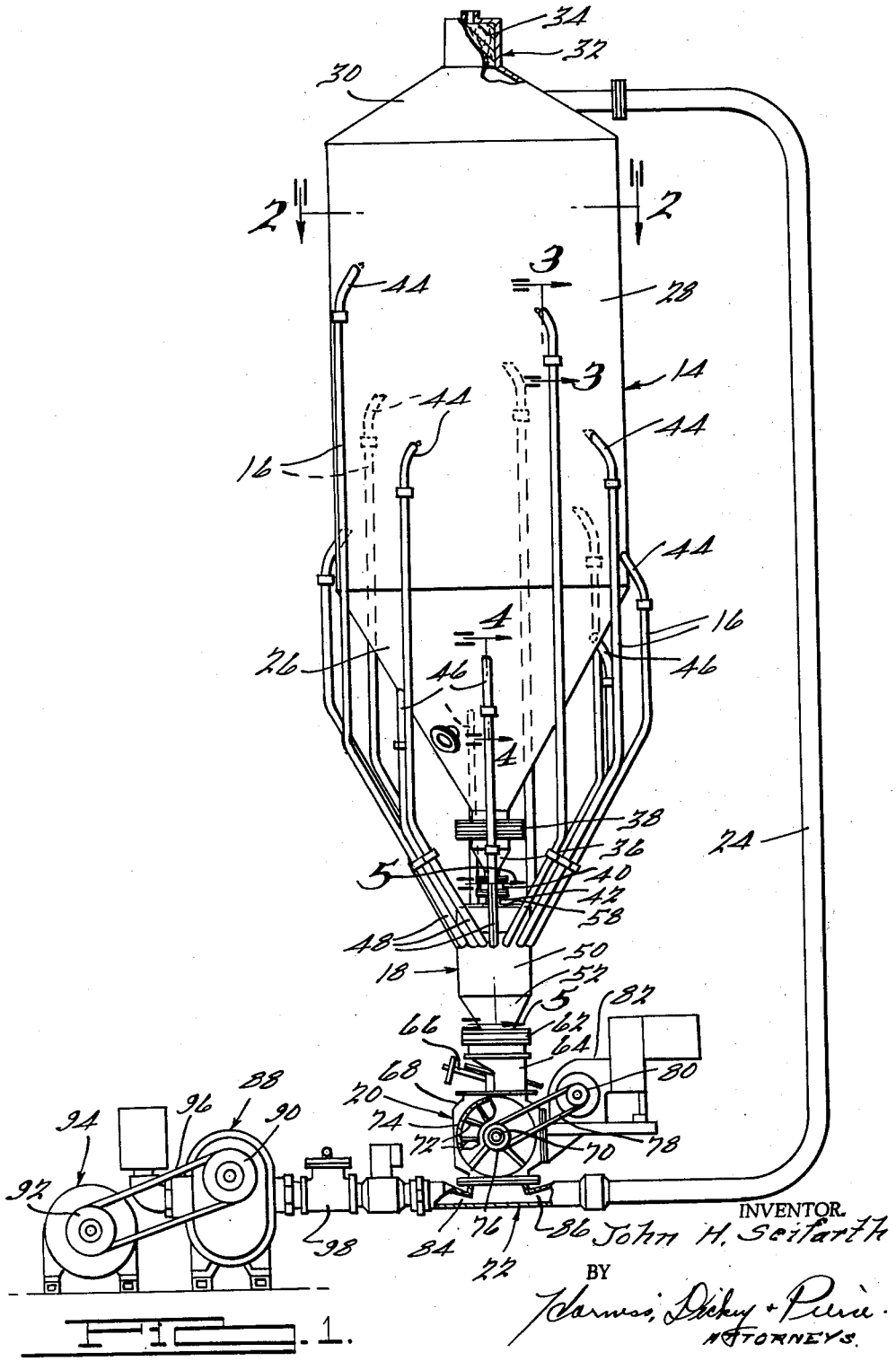
Figure 2:
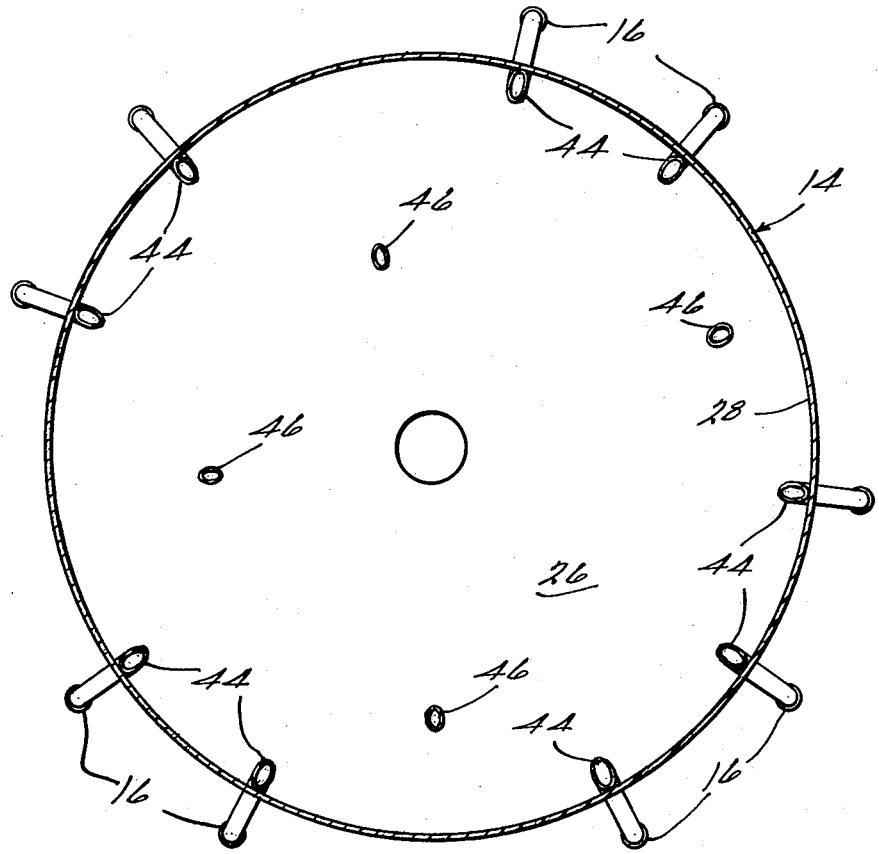
FIG. 2 is a magnified transverse sectional view of the storage tank of the blending apparatus shown in FIGURE 1 and taken along the line 2—2 thereof.

Referring now in detail to the drawings and as may be best seen in FIG. 1, a blending apparatus which may be used with the method in accordance with the present invention comprises a combination mixing and storage tank or hopper 14 which is supported by a suitable frame (not shown for the purposes of clarity) that maintains the tank in a substantially upright position. A plurality of manifold feed conduits 16 are connected to the tank 14 at diverse circumferential and vertically spaced positions which extend downwardly and exteriorly of the tank 14 and are connected in substantially equal circumferentially spaced relationship to an automatic leveling and flow control collector manifold or receptacle 18. The base of the collector manifold 18 is connected to a rotary feeder 20 through which the granular material passes and drops into a pneumatic pickup tube 22 and is discharged therefrom through a return conduit 24 back into the upper portion of the tank 14.

The particular tank 14 shown in the drawings is of a circular cross-sectional configuration comprising a conical base portion 26, a cylindrical intermediate portion 28 and an inverted conical dome or top 30. While the preferred cross-sectional configuration of the tank 14 is circular, alternate satisfactory configurations such as square, hexagonal, elliptical, etc., can also be satisfactorily employed with appropriate modifications in the specific location of the outlet nozzles so as to achieve the desired internal flow pattern of the granulated material and to avoid any localized stratification therein.

The interior of the tank 14 is vented through a removably mounted closure or cover 32 mounted on the top section 30 thereof. The cover 32 incorporates a suitable porous matrix or filtering medium 34 therein through which the air employed for conveying the granulated material up through the return conduit 24 is discharged. The cover 32 is removably mounted on the tank top enabling simple removal thereof for charging the granular materials to be mixed into the interior of the tank. The conical base portion 26 of the tank 14 at its apex is formed with an outlet 36 having a suitable flanged valve 38 interposed therein for opening or closing the flow of material out from the lower portion of the tank. The tank outlet 36 is tapered at its base and discharges into a butterfly valve assembly 40 as may be best seen in FIG. 5, which in turn is connected to a tank outlet conduit 42 which is disposed in the center of the upper portion of the collector manifold 18. The manipulation of the flanged valve 38 and the butterfly valve assembly 40 serve to start, stop, and regulate the flow of material out of the base of the tank in a manner which will be subsequently described.

The interior of the tank 14 is disposed in communication with a plurality of outlet nozzles 44, 46 as best seen in FIGURES 1–5 which are disposed at diverse vertical and circumferentially spaced locations around the cylindrical intermediate portion 28 and conical base portion 26 thereof, respectively. The outlet nozzles 44, 46 are securely affixed to the wall of the tank such as by welding, for example, and are angularly inclined relative to the vertical axis of the tank so as to facilitate uninhibited gravitational flow of the granular material from the tank through the outlet nozzles. In the specific embodiment of the blending apparatus shown in FIGURES 1, 3 and 4, the outlet nozzles 44, 46 are inclined at an angle of about 30° from the vertical axis of the tank 14.

The particular location of the outlet nozzles 44, 46 and the number employed will vary in accordance with the specific configuration, volume, and height of the tank as well as the general nature of the material being blended. The particular location of the outlet nozzles 44, 46 is selected so that geometrically similar sections of the tank are provided with an outlet nozzle whereby the solid granulated or particulated material therein is withdrawn substantially equally through each of the outlets providing uniform sampling of the initial stratified or layered charge as well as uniform sampling of a partially blended batch during the blending operation. In accordance with the selected location of the outlet nozzles, localized stratification of unmixed or partially mixed material is eliminated assuring the formation of a substantially uniform blend within a relatively few number of batch turnover cycles. In the specific blending apparatus as shown in FIGURE 1, 13 outlet nozzles are provided which have been found adequate for providing substantially uniform withdrawal of the material from a tank having a diameter of about 12 feet and a height of about 30 feet.

Figure 4:
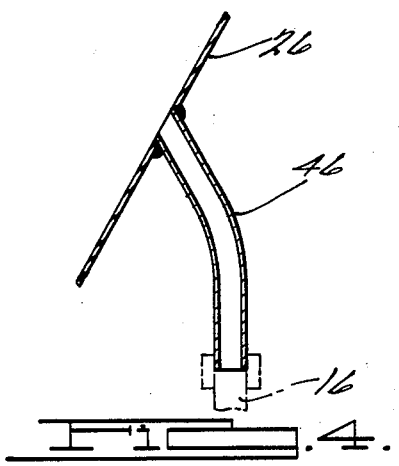
FIG. 4 is a magnified fragmentary vertical sectional view of an outlet nozzle connected to the lower conical portion of the tank shown in FIGURE 1 and taken along the line 4—4 thereof.
Figure 3:
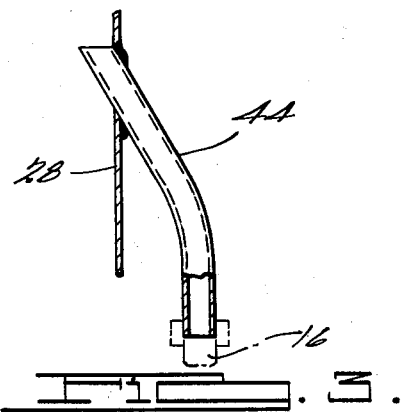
FIG. 3 is a magnified fragmentary vertical sectional view of an outlet nozzle connected to the upper portion of the storage tank shown in FIGURE 1 and taken along the line 3—3 thereof.

The specific configuration of the outlet nozzles 44, 46 are best seen in FIGURES 3 and 4. The outlet nozzle 44 as shown in FIGURE 3, projects inwardly through the wall of the cylindrical intermediate portion 28 of the tank at an angle of about 30° and is formed at its inlet end with a surface which is disposed in a substantially horizontal plane. The outlet nozzle 46 as shown in FIGURE 4, is positioned with its inlet surface flush with the inner surface of the conical base portion 26 of the tank. It is preferred that the surfaces of the outlet nozzles 44, 46 and the means for securing the nozzles to the tank wall provide a relatively smooth finished internal surface so as to avoid any entrapment of the particulated material being blended thereby minimizing contamination of any succeeding batches with such residuary materials.

The outlet nozzles 44, 46 are connected to the feed conduits 16 by suitable couplings as shown in phantom in FIGURES 3 and 4, forming a smooth transition. The feed conduits 16 extend downwardly in a substantially vertical direction and thence radially and angularly inwardly in substantially equal circumferentially spaced intervals and are connected to a plurality of inlet nozzles 48 secured in circumferentially spaced relationship around the periphery of the collector manifold 18 as best seen in FIGURE 5. The inner diameter of the outlet nozzles 44, 46; the feed conduits 16, and the inlet nozzles 48 is greater than that necessary to convey the flow of material during a blending operation. The overcapacity of the outlet nozzles, feed conduits, and inlet nozzles provides for substantially uniform flow rates through each inlet nozzle as automatically controlled by the self leveling collector manifold 18.

The collector manifold 18, as may be best seen in FIGURE 5 comprises an upper cylindrical section 50 which is connected along its lower end to a conical base portion 52 which is formed with a flanged outlet 54 for discharging the material therein. The inlet nozzles 48 are secured within a plurality of ports 56 disposed in substantially equal circumferentially spaced increments around the periphery of the upper cylindrical section 50 and are disposed in substantially a common horizontal plane. The connection of the inlet nozzles 48 to the wall of the upper cylindrical section 50 of the collector manifold may conveniently be achieved such as by welding and the inner surface of the inlet nozzle is preferably flush with the interior surface of the collector manifold to avoid any entrapment of the materials during a mixing operation. In the specific arrangement of the collector manifold 18 and the inlet nozzles 48 as shown in FIGURE 5, 13 inlet nozzles are employed which are radially positioned and project at an angle of about 30° from the vertical axis of the collector manifold and are connected at their upper ends by suitable couplings as shown in phantom in FIGURE 5 to the lower end portions of the feed conduits 16.

The collector manifold 18 as shown in FIGURE 5 is provided with a closure or top plate 58 through substantially the center of which the tank outlet conduit 42 extends and is rigidly secured thereto such as by welding. The top 58 is preferably provided with one or more removable or hingedly mounted cover plates 60 providing for visual inspection of the flow pattern of materials therein as well as providing access for periodic cleaning and service of the interior of the collector manifold.

The flanged outlet 54 of the collector manifold 18 is connected to a flanged butterfly valve assembly 62 which in turn is connected to an inlet conduit 64 mounted on the upper portion of the rotary feeder 20. The inlet conduit 64 is provided with a suitable valve such as a gate valve 66 which is manually or remotely actuable to control the flow of material through the inlet conduit 64 into the rotary feeder.

The rotary feeder 20, as best seen in FIGURE 1, comprises a housing 68 in which a shaft 70 is rotatably mounted having a plurality of vanes 72 projecting radially therefrom having the ends thereof disposed in clearance relationship relative to a circular shroud 74 within the housing 68. The projecting end of the shaft 70 is provided with a driven pulley 76 around which a drive belt 78 is trained and extends around a drive pulley 80 connected to the shaft of a motor 82. Provisions are preferably incorporated for driving the shaft 70 of the rotary feeder 20 in a clockwise direction as viewed in FIGURE 1 at variable selected speeds to provide the requisite feed rate consistent with that for achieving optimum blending of the material. This may conveniently be achieved by employing variable diameter driven pulley 76 and/or drive pulley 80, by employing a variable speed motor 82, or by interposing any one of a number of well known suitable speed reducers between the output shaft of the motor 82 and the drive belt 78.

The material enters the interior of the rotary feeder 20 through the inlet conduit 64 which is laterally offset from the center of the housing in a direction of the movement of the vanes 72 which minimizes attrition or abrasive action of the granular material in the feeder as well as avoiding any jamming or plugging of the interior thereof. The material entering the rotary feeder is arcuately conveyed between adjacent ones of the vanes 72 and is discharged through the base of the housing 68 of the rotary feeder into the pneumatic pickup tube 22.

The pneumatic pickup tube 22 as fragmentarily shown in section in FIGURE 1, comprises an inlet port generally indicated at 84 through which a high velocity pressurized jet of air is discharged sweeping the granular material as it drops into the center section thereof out through an outlet port 86 and thence upwardly through the return conduit 24 back into the top of the tank 14. The close fitting relationship between the vanes 72 and the circular shroud 74 of the rotary feeder 20 prevents the jet of air from backing up into the collector manifold 18 through the inlet conduit 64 and interfering with the automatic flow control of the manifold.

The high velocity air stream is supplied from a blower 88 having its driven pulley 90 drivingly connected to a drive pulley 92 on the output shaft of a motor 94 by means of a suitable flexible belt 96. The control of the pressure and velocity of the jet of air passing through the pneumatic pickup tube 22 can be regulated by a suitable valve 98 connected to the discharge side of the blower as well as by varying the speed of rotation of the motor 94 or the ratio of the diameters of the driven pulley 90 and/or the drive pulley 92. The particular pressure and volume of air delivered to the pneumatic pickup 22 will vary depending upon the type of material being mixed, the rate of circulation of the material, and the size and height of the several connecting conduits including the return conduit 24. Conventionally, the recirculation rate is controlled so as to prevent segregation of the blended mixture deposited in the pickup tube and to avoid abrasion or attrition of the particles during their return to the storage tank. It will be understood that alternate satisfactory means can be employed, such as a bucket elevator or conveyor, a screw conveyor, a belt conveyor, and the like in lieu of the pneumatic lift mechanism for recirculating the material back into the top of the tank.

An alternate satisfactory arrangement of the disposition of the outlet nozzles and feed conduits in a tank 14a is illustrated in FIGURES 7 and 8. As shown in the drawings, the tank 14a is of similar construction to the tank 14 shown in FIGURE 1 and comprises a cylindrical intermediate section 28a and a conical base portion 26a in which a plurality of conduits 100 are disposed projecting upwardly in a substantially vertical direction through the wall of the conical base portion 26a. The height and the radial and circumferential disposition of the ends of the conduits 100 are varied in a manner so as to withdraw material through the open inlet ends thereof from similar geometrical sections of the tank providing uniform sampling of the granular material therein. In accordance with this construction, the periphery of the tank is rendered free of the outlet nozzles 44, 46 and feed conduits 16 as present in the blender construction shown in FIGURE 1. The lower ends of the conduits 100 are connected to a collector manifold 18 of the blender apparatus through suitable inlet nozzles in accordance with the construction shown in FIGURE 1.

In the operation of the blending apparatus, and with particular reference to FIGURES 1, 5 and 6, the flanged valve 38 and the flanged butterfly assembly 62 are closed and the cover 32 is removed enabling charging of the granular or particulated material to be blended into the interior of the tank 14. A typical stratified or layered charge of three dissimilar materials at the commencement of a blending operation is diagrammatically illustrated in FIGURE 6. After the tank has been charged with the requisite proportions of the several materials, the cover 32 is secured in place. During the initial charging operation the several outlet nozzles 44, 46; the feed conduits 16, the inlet nozzles 48, and the collector manifold 18 become filled with the material to be mixed. The collector manifold 18 fills to a position as shown in FIG. 5 wherein the material attains a level corresponding to the upper portion of the ports 56 therearound automatically stopping the flow of further material through the feed conduits. The material is retained within the interior of the collector manifold 18 by the flanged butterfly valve assembly 62 which is in the closed position.

In this condition, the blower motor 94 and the rotary feeder motor 82 are energized whereupon a jet of air is passed through the pneumatic pickup tube 22 and the shaft 70 and vanes 72 thereon commence to rotate. The blending action is initiated by opening the flanged butterfly assembly 62 whereby material is drawn from the interior of the collector manifold 18 and passes through the inlet conduit 64 into the rotary feeder from which it drops into the pneumatic conduit and is carried upwardly through the return conduit 24 back to the top of the tank. Concurrently with the opening of the flanged butterfly valve assembly 62, the flanged valve 38 in the tank outlet 36 is opened whereby material from the base of the conical portion 26 of the tank is discharged into the collector manifold.

The rate of material withdrawal from the conical base portion of the tank is controlled by the manipulation of the butterfly valve 40 as best seen in FIGURE 5 so as to provide an apppropriate flow relative to that present to the several outlet nozzles, feed conduits and inlet nozzles connected to the collector manifold. The over-all recirculation rate of material discharged from the collector manifold is controlled by the opening of the gate valve 66 which is presettable in the desired position. The rate of withdrawal of the material from the manifold is controlled at a magnitude less than the capacity of material flow into the manifold through the several feed conduits and inlet nozzles whereby the level of the material in the manifold remains in at least partial blocking relationship of the ports 56 as shown in FIG. 5 thereby regulating the discharge rate of material therefrom. By virtue of the incorporation of the flanged valve 38 and the flanged butterfly valve assembly 62 the butterfly valve 40 and the gate valve 66 can be retained in a preset condition for succeeding blending operations of similar materials without necessitating a readjustment thereof.

The flow pattern of the stratified layered charge during the initial phase of the blending operation is diagrammatically illustrated by the arrows in FIGURE 6 whereby substantially uniform sampling of geometrically similar sections of the material in the tank is obtained. The material discharged through the outlet nozzles 44, 46 is carried by the feed conduit 16 through the inlet nozzles 48 to the interior of the collector manifold 18 as shown in FIGURE 5 wherein it is intermingled and mixed. A general vertical downwardly flow of the material through the tank also occurs by virture of the withdrawal of the material through the several outlet nozzles 44, 46 and the outlet 36 in the base of the tank which is replenished as the material is returned through the return conduit 24.

The self-leveling and flow control feature of the collector manifold is best seen in FIG. 5 whereby the discharge of material to the collector manifold through each of the inlet nozzles 48 is maintained substantially equal without the use of a complex or elaborate valving mechanism. The granular material is shown in FIG. 5 positioned at a level adjacent to the inner surface of the upper cylindrical section 50 of the collector manifold 18 at a level corresponding substantially to the top of the ports 56 through which the granular material flows inwardly from each of the inlet nozzles 48. The blocking relationship of this material provides for a controlled flow of the material from the inlet nozzles which are substantially completely filled with the granular material supplied thereto through the feed conduits 16, and the outlet nozzles 44, 46 connected thereto. Any tendency of one inlet nozzle to discharge material more rapidly than another causes a build-up of the material adjacent to its port 56 blocking further flow or reducing the rate of flow to an amount substantially equal with that through each of the remaining inlet nozzles. The specific rate of flow through each of the inlet nozzles is controlled by the rate at which material is withdrawn through the flanged outlet 54, at the base of the collector manifold and as controlled by the opening of the gate valve 66.

The flow of material downwardly and out of the collector manifold is diagrammatically illustrated by the arrows as shown in FIG. 5. The rate of flow is substantially uniform across the entire section of the collector manifold moving downwardly and radially inwardly toward the flanged outlet 54 at the base thereof. The withdrawal of material from the manifold occurs substantially uniformly adjacent to each of the ports 56 thereby providing for a substantially uniform discharge of material from each inlet nozzle.

A slightly greater flow is present adjacent to the vertical axis of the collector manifold forming somewhat of a dished or concave surface layer of the granular material therein which, to a large extent is compensated for by the axial discharge of material from the base of the tank through the tank outlet conduit 42 extending inwardly through substantially the center of the top 58. As hereinbefore mentioned, the flow of material through the tank outlet conduit 42 is controlled by the butterfly valve 40 to achieve the desired internal flow pattern of the material and avoid any stratification thereof in the lower portion of the conical base 26 of the tank.

At the completion of the blending operation, the flanged butterfly valve assembly 62 is closed and the flanged valve 38 is closed whereby the balance of the material in the inlet conduit 64, the rotary feeder 20 and in the pneumatic pickup tube 22 is carried through the return conduit 24 and discharged into the top of the tank 14. The rotary feeder motor 82 and the blower motor 94 are thereafter de-energized in which position the blending apparatus is in a stand-by condition. The blended material may be drained from the tank 14 through a suitable port or, if desired, can be discharged through a suitable side branch of the return conduit 24 by re-energization of the rotary feeder and blower which carries the entire blended charge to a suitable storage hopper or tank preparatory to use.

It will be apparent from the foregoing that the novel collector manifold 18 comprising the present invention provides positive and automatic regulation of the rate of flow of the material through each of the feed conduits which, in combination with the appropriate dispostion of the outlet nozzles 44, 46, at similar geometrical sections of the combination storage and blending tank 14 to provide substantially uniform sampling of the material therein provides extreme simplicity in achieving uniform blends of dissimilar materials within a minimum of time and requiring a minimum of regulatory control.

As a typical illustration of the blending of two dissimilar granular or particulated materials, a blender of the type shown in FIGURE 1, comprising a tank having a diameter of about 12 feet and a height of about 30 feet and having a 60,000 pound capacity was employed for blending substantially equal proportions of black and white cubical pellets of ⅛-inch polyethylene to achieve a homogeneous gray mixture on subsequent fusion and extrusion of the blended pellet mixture. To achieve appropriate flow of material, the feed conduits 16 were of a 3-inch inside diameter, the return conduit 24 was of a 4-inch inside diameter, the output of the blower 88 was controlled at about 450 cu. ft. of air per minute, and a pressure drop through the system was about 8 pounds per square inch. The speed of the polyethylene cubes or pellets averaged between about 90 to about 110 ft. per second through the return conduit 24 at a recirculation rate of about 20,000 pounds per hour and only from about 2 to about 4 charge turnovers were required to form a relatively uniformly blended batch from a stratified charge of the two dissimilar plastic colored pellets.

An alternate satisfactory construction of the collector manifold employing an extended tank outlet conduit is illustrated in FIG. 9 wherein similar components to the collector manifold 18 previously described are indicated by the same numeral hereinbefore employed with the suffix letter "b" affixed thereto. In the particular arrangement shown the tank outlet conduit 42b extends downwardly and axially of the collector manifold 18b to a position wherein the lower end thereof is adjacent to the level of the granular material in the collector manifold. In accordance with this construction the material in the manifold will automatically adjust the flow of the material through the tank outlet conduit 42b in a manner similar to that hereinbefore described with respect to the inlet nozzles such as the inlet nozzles 48b shown in FIG. 9. In view of the fact that the granular material in the collector manifold 18b has a tendency to flow downwardly more rapidly in the center region of the manifold, it is preferred that the lower end of the tank outlet conduit 42b be positioned at a point spaced below the upper portion of the ports 56b around the periphery of the manifold to compensate for the conventional dish-shaped contour of the granular material therein. It is conventionally preferred to also include the butterfly valve 40b to regulate the maximum flow rate of the material out through the center of the base portion of the tank through the outlet 36b. Alternatively, the diameter of the tank outlet conduit 42b can be appropriately gauged so as to provide a flow rate corresponding substantially to that present through the inlet nozzles 48b.

Still another alternate satisfactory arrangement of the tank outlet conduit is shown in a collector manifold 18c illustrated in FIG. 10. Similar or corresponding components of the collector manifold 18c to that previously described are designated by the same numeral hereinbefore employed with the suffix letter "c" affixed thereto. In the specific arrangement illustrated in FIG. 10, the tank outlet conduit 42c is laterally curved radially outwardly and downwardly and is connected to a port 56c around the periphery of the collector manifold 18c in a manner identical to that of the inlet nozzles 48c. By virtue of this construction, regulation of the flow of material out of the base portion of the tank is controlled in the same manner as the withdrawal of material through the several outlet nozzles positioned at diverse locations therearound.

In such an arrangement, a butterfly valve 40c may not be necessary but is desirable in some instances to furnish further control of the material discharged from the base of the conical portion of the tank.

An alternate satisfactory disposition of the discharge ends of the inlet nozzles into a collector manifold 18d is illustrated in FIGS. 11 and 12. Similar components of the collector manifold 18d to that previously described in connection with the collector manifold 18 shown in FIG. 5, are designated by the same numeral with the suffix letter "d" affixed thereto. As shown in FIGS. 11 and 12 the inlet nozzles 48d enter the collector manifold 18d through the top 58d thereof and are vertically positioned in substantially equal circumferentially spaced intervals around the inner side wall of the upper cylindrical section 50d thereof. The downwardly directed ends of the inlet nozzles 48d are positioned in a substantially horizontal plane so as to be equally blocked and controlled by the level of the granulated material in the collector manifold. In this particular construction either one of the forms of the tank outlet conduit can be employed such as shown in FIGS. 5, 9 and 10. Alternatively, in the specific structure shown in FIGS. 11 and 12, the tank outlet conduit can enter the collector manifold through the cover 58d and can be disposed between a pair of inlet nozzles 48d in appropriate circumferentially spaced relationship whereby the discharge of the material from the base of the tank is controlled in the same manner as the discharge of the material through each of the inlet nozzles. By this arrangement all 14 withdrawal locations in the typical blending apparatus shown in the drawings is simultaneously and automatically controlled assuring substantially equal flow rates and uniform blending of the material in the tank.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of uniformly mixing solid particulated materials which comprises the steps of consolidating the materials to be mixed in a tank, withdrawing the consolidated material from said tank in substantially equal amounts at a plurality of diverse geometrically similar locations to achieve uniform sampling of the material therein, transferring the material withdrawn downwardly through a plurality of conduits by gravity, discharging the material from each of said plurality of conduits into a collector manifold at substantially the same discharge level, allowing the level of the material in said manifold to rise to a level wherein at least a portion of the discharge opening of each of said plurality of conduits is blocked with material maintaining a controlled gravitational discharge of material therefrom into said manifold, and withdrawing the material from said manifold below the upper surface of the material at a controlled rate and maintaining at least a partial blocking of each of said discharge openings.

2. The method of uniformly mixing solid particulated materials which comprises the steps of consolidating the materials to be mixed in a tank, withdrawing the consolidated material from said tank in substantially equal amounts at a plurality of diverse geometrically similar locations to achieve uniform sampling of the material therein, transferring the material withdrawn downwardly through a plurality of conduits by gravity, discharging the withdrawn material from each of said plurality of conduits into a collector manifold at substantially the same discharge level, allowing the level of the material in said manifold to rise to a point wherein at least a portion of the discharge opening of each of said plurality of conduits is blocked maintaining a controlled gravitational discharge of material therefrom into said manifold, and withdrawing the material from said manifold at a point below the upper surface of the material at a controlled and substantially uniform rate adjacent to each of said discharge openings maintaining partial blocking of each of said discharge openings.

3. The method as described in claim 1 wherein at least a portion of the material withdrawn from said manifold is recycled back to the top of said tank.

4. The method as described in claim 2 wherein at least a portion of the material withdrawn from said manifold is recycled back into the upper portion of said tank.

References Cited by the Examiner
UNITED STATES PATENTS

| 455,082 | 6/91 | Wilson | 259—180 |
| 3,106,385 | 10/63 | Arthur et al. | 259—180 |

FOREIGN PATENTS 847,731 9/60 Great Britain.

OTHER REFERENCES 1,034,464, July 17, 1958, German printed application.

WALTER A. SCHEEL, *Primary Examiner.*